3,611,613
CASTING FLOAT FOR LIVE BAIT
Robert Perches, 2147 W. 162nd St.,
Gardena, Calif. 90247
Filed Feb. 20, 1970, Ser. No. 13,037
Int. Cl. A01k 97/04
U.S. Cl. 43—41.2                        10 Claims

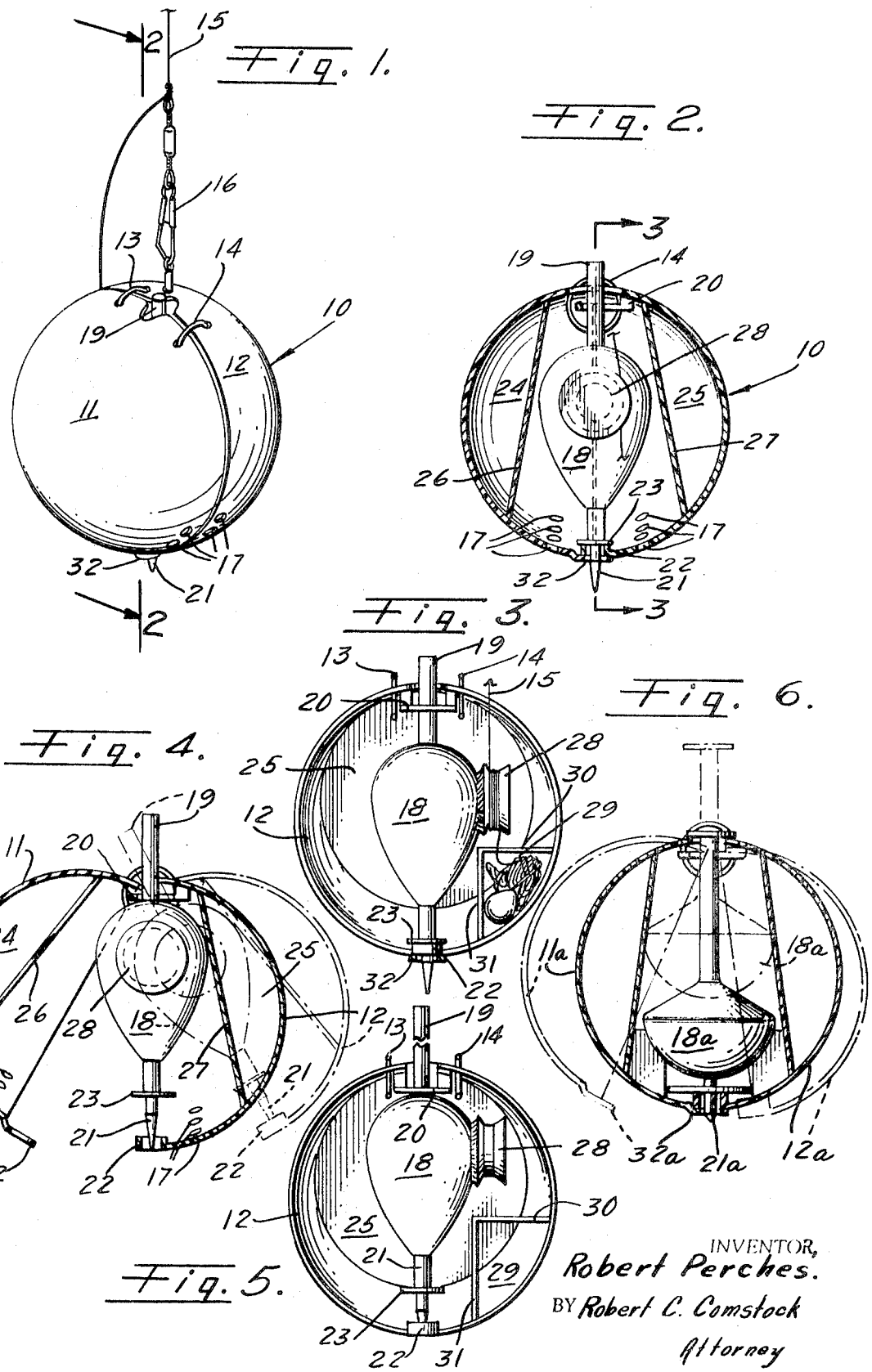

ABSTRACT OF THE DISCLOSURE

A casting float which releasably encloses and protects live bait during casting. The casting float comprises a pair of float halves having air compartments arranged to cause the float to move automatically to an upright position as soon as it enters the water. A movable float disposed within the casting float is automatically moved upwardly by water buoyancy to automatically open the casting float and permit the live bait, hook and sinker to fall into the water.

BACKGROUND OF THE INVENTION

Field of the invention

This invention relates to a casting float for use by fishermen in casting live or soft bait.

Description of the prior art

Various forms of live bait casting devices, including floats, can be found in the prior art. All of the prior devices are believed to be deficient in one way or another in comparison with the present structure and invention.

SUMMARY OF THE INVENTION

The invention comprises a casting float for use by fishermen in casting live or soft bait.

The primary object of the invention is to provide a float type of device which is adapted to releasably enclose and protect the hook, bait, sinker and end of the line during the casting operation. Without such protection, live or soft bait is often thrown loose during the cast. When the float strikes the water, it automatically moves to an upright position and automatically opens to release its contents into the water.

It is an object of the invention to provide such a device which is an improvement over the prior art because it is simplier in its structure and more certain and effective in its operation.

It is a more particular object of the invention to provide a device of the class described in which a movable float member which is enclosed within the casting float acts as a latch to hold the casting float closed to protect the bait until the casting float strikes the water. The movable float is then automatically lifted by the buoyancy of the water to release and open the casting float and thereby permit its contents to enter the water.

It is accordingly among the objects of the invention to provide a casting float having all of the advantages and benefits set forth above as well as those possessed by the invention shown and described herein.

The invention also comprises such other objects, advantages and capabilities as will later more fully appear and which are inherently possessed by the invention.

While there are shown in the accompanying drawings preferred embodiments of the invention, it should be understood that the same are susceptible of modification and change without departing from the spirit of the invention.

DESCRIPTION OF THE DRAWINGS

Referring to the drawings:

FIG. 1 is an isometric view of the casting float in closed position;

FIG. 2 is a longitudinal section view of the same taken on line 2—2 of FIG. 1;

FIG. 3 is a transverse sectional view of the same taken on line 3—3 of FIG. 2;

FIG. 4 is a sectional view similar to FIG. 2, showing the float half 11 released from the float half and moving upwardly and outwardly, with the float half 12 shown in solid lines in its normal position and in phantom lines moving upwardly and outwardly;

FIG. 5 is a sectional view similar to FIG. 3, showing the float half 12 in open position with its contents discharged;

FIG. 6 is a sectional view similar to FIG. 2, showing an alternative embodiment of the invention in closed position in solid lines and in opening position in phantom lines.

DESCRIPTION OF THE PREFERRED EMBODIMENT

The preferred embodiment which has been selected to illustrate the invention comprises a spherical casting float 10, which is divided into a pair of hemispherical float halves 11 and 12 respectively. The upper ends of the float halves 11 and 12 are pivotally secured to each other by a pair of spaced circular hinged rings 13 and 14.

A casting line 15 is secured at one end thereof to a fishing pole or the like (not shown) and is secured at its other end to connector means 16 which are attached to the upper end of the float half 12.

The lower portion of each of the float halves 11 and 12 is provided with a plurality of spaced openings 17 which permit water to enter the float 10 as soon as it is cast into the water.

A hollow movable float 18 carries a stem 19 which slidably projects through a horizontally directed circular ring 20 which is secured to the upper portion of the float half 12 and which extends into the adjacent float half 11.

The lower end of the movable float 18 carries a projection 21 having a tapered end which slidably extends through a horizontally directed circular ring 22 which is secured to the lower portion of the float half 12 and which extends into the adjacent float half 11 and a lower horizontally directed ring 32 which is secured to the lower portion of the float half 11 and which is disposed directly beneath and aligned with the ring 22.

The circular rings 20, 22 and 32 are substantially aligned with each other to define a path of vertical movement of the movable float 18 which is disposed substantially along the vertical axis of the casting float 10. Upward movement of the movable float 18 within the casting float 10 is limited by engagement of the upper end of the movable float 18 with the upper circular ring 20. The parts of the device are preferably dimensioned in this embodiment of the invention so that the upper end of the movable float 18 will engage the ring 20 while the tapered lower end of the projection 21 moves upwardly out of engagement with the ring 22, as shown in FIG. 4 of the drawings. When the projection 21 moves upwardly out of the ring 32, the float half 11 is released, but the float 18 is held captive within the float half 12, where it can only move between the rings 20 and 22.

Downward movement of the movable float 18 is limited by an annular washer 23 which extends around the lower end of the projection 21. The washer 23 engages the lower ring 22 when the movable float 18 is in downward position, as shown in FIGS. 2 and 3 of the drawings.

The float halves 11 and 12 are provided with sealed air compartments 24 and 25 respectively. The outer walls of the air compartments 24 and 25 are defined by the adjacent portions of the periphery of the float halves 11 and 12. The inner walls of the air compartments 24 and 25 are defined by straight segmental walls 26 and 27 respectively which extend upwardly at an inwardly directed angle. The major portions of the air compartments 24 and 25 are accordingly disposed above the longitudinal axis of the casting float 10, so that when the casting float enters the water it will automatically be moved to an upright position, as shown in FIG. 2 of the drawings. Due to the orientation of the air compartments 24 and 25, this is the only stable position of the casting float 10 when it is disposed in the water.

Mounted on one side of the movable float 18 is a small stationary reel 28, around which the end of the line 15 may be removably wound.

The lower portion of the interior of the float half 12 is provided with a bait compartment 29, the outer wall of which is defined by the adjacent portion of the periphery of the float half 12. The inner edges of the bait compartment 29 are defined by a pair of short walls 30 and 31 which intersect at a right angle. The bait compartment 29 is open on the side thereof facing toward the float half 11 and is adapted to removably receive and hold the end of the line 15, including the hook, bait and sinker.

In use, the hook, bait and sinker are placed within the bait compartment 29, with the adjacent end portion of the line 15 being wound around the reel 28. The casting float 10 is then closed, with the lower end of the projection 21 extending through the rings 22 and 32 to provide a latch which holds the casting float 10 closed.

The casting float 10 is then cast into the water. As soon as it enters the water, water flows through the openings 17 into the entire interior of the casting float 10 except for the sealed interiors of the air compartments 24 and 25 and the movable float 18. As described above, the orientation of the air compartments 24 is arranged so that the casting float 10 will move to the upright position shown in FIG. 2 of the drawings. The buoyancy of the water then causes the movable float 18 to move upwardly so that the lower end of the projection 21 is moved upwardly out of engagement with the ring 32.

The lower portion of the float half 11 is thereby released from its connection to the float half 12. Its air compartment 24 causes the float half 11 to move automatically in an upward and outward direction, as shown in FIG. 4 of the drawings. The remaining float half 12 will also be pivoted upwardly and outwardly away from the float half 11 by its air compartment 25. The movable float 18 will be carried along with the float half 12. The separation of the float halves 11 and 12 and their subsequent upward movement cause the sinker, hook and bait to fall into the water from the bait compartment 29.

FIG. 6 of the drawings shows an alternative embodiment of the invention in which the parts are substantially identical except that the movable float 18a has a slightly different shape and its upward movement is not as restricted. When the movable float 18a is moved upwardly by the buoyancy of the water, the projection 21a at its lower end moves out of engagement with both of the lower rings 22a and 32a, so that both of the float halves 11a and 12a are free to move upwardly apart from each other, as suggested by phantom lines of FIG. 6 of the drawings. The actual movement of the float halves 11a and 12a apart from each other will be substantially greater than that shown in the drawings, since they would approach a horizontal open position as opposed to their closed vertical position.

The actual movement of the float halves 11 and 12 in the first embodiment of the invention is also substantially greater than that shown in FIG. 4 of the drawings, since they would also approach a horizontal open position as opposed to their closed vertical position.

I claim:

1. A casting float for live bait comprising a pair of float halves releasably secured to each other, bait holding means disposed within said casting float for removably holding the bait and hook of a fishing line, a movable float disposed within said casting float, said movable float having latch means releasably acting to hold said float halves together in closed position, and means permitting water to enter said casting float when it is cast into the water, whereby said movable float is buoyantly moved upwardly within said casting float to release said float halves from engagement with each other and thereby release said bait and hook into the water.

2. The structure described in claim 1, said float halves being pivotally secured to each other adjacent their upper portions, each of said float halves having a sealed air compartment, said air compartments being adapted to cause said float halves to move away from each other when said latch means is released.

3. The structure described in claim 2, the major portions of said air compartments being disposed adjacent to the upper portions of said float halves, whereby said casting float upon being cast into the water is automatically oriented into an upright position and whereby the lower portions of said float halves are buoyantly pivoted upwardly and outwardly away from each other when said latch means is released.

4. The structure described in claim 3, said float halves being substantially hemispherical in shape, and said air compartments comprising segments of the upper portions of said float halves.

5. The structure described in claim 3, and a reel mounted within said casting float, said reel being adapted to removably hold the end portion of the fishing line adjacent to the bait and hook.

6. The structure described in claim 3, each of said float halves having an opening disposed adjacent its lower end, said openings being disposed in overlapping relationship to each other when said casting float is in closed position, said movable float having a projection extending downwardly from its lower end, said projection removably extending through said openings to selectively latch or release the lower ends of said float halves with respect to each other.

7. The structure described in claim 3, said movable float being permanently mounted within one of said float halves, the other of said float halves having a ring disposed adjacent its lower end, said movable float having a projection adapted to removably engage said ring to selectively latch or release the lower ends of said float halves with respect to each other.

8. The structure described in claim 7, the float half in which said movable float is mounted having a ring disposed adjacent its upper end and an opening disposed adjacent its lower end, said movable float having a pair of projections at its opposite ends, said projections extending through said ring and opening, said ring and opening acting to limit the vertical movement of said movable float within said float half.

9. The structure described in claim 8, said float halves being substantially hemispherical in shape, and said air compartments comprising segments of the upper portions of said float halves.

10. The structure described in claim 9, and a reel mounted within said casting float, said reel being adapted to removably hold the end portion of the fishing line adjacent to the bait and hook.

(References on following page)

References Cited

UNITED STATES PATENTS

| | | | |
|---|---|---|---|
| 2,435,011 | 1/1948 | Mason | 43—41.2 |
| 2,457,715 | 12/1948 | Pazzano | 43—41.2 |
| 2,720,720 | 10/1955 | Landrum | 43—43.11 |
| 2,740,224 | 4/1956 | Heiderich | 43—43.1 |
| 3,084,468 | 4/1963 | Christophel | 43—41.2 |
| 3,190,028 | 6/1965 | Mambrin | 43—41.2 |
| 3,163,957 | 1/1965 | Barrett | 43—41.2 |

MELVIN D. REIN, Primary Examiner

U.S. Cl. X.R.

43—43.11, 44.99